H. D. PERKY, DEC'D.
L. SPARKS, ADMINISTRATOR.
MANUFACTURE OF FOOD FROM CEREALS.
APPLICATION FILED JAN. 19, 1906.
987,088.
Patented Mar. 14, 1911.
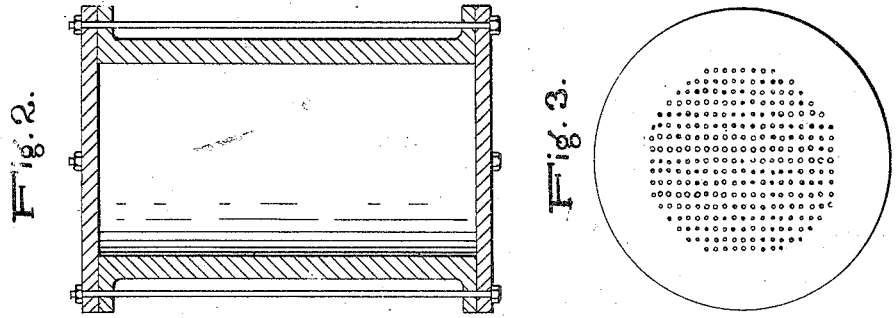
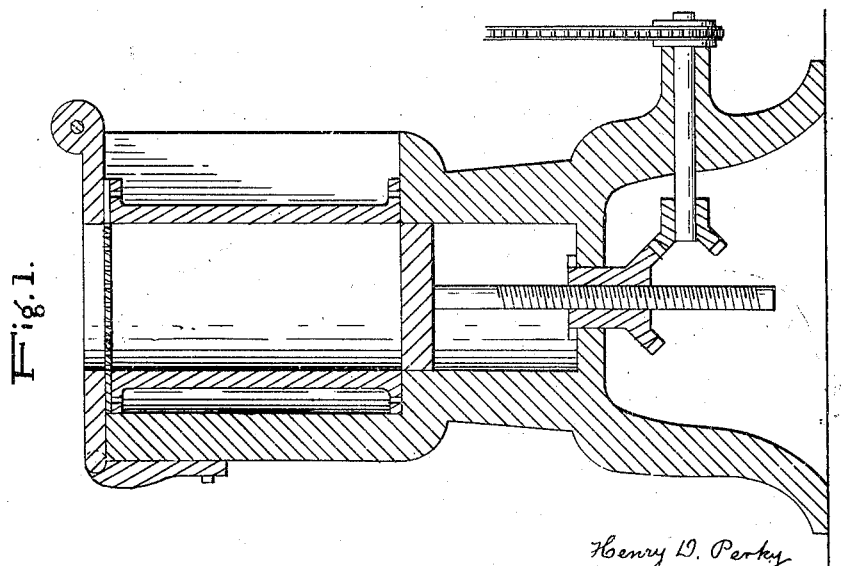

UNITED STATES PATENT OFFICE.

HENRY D. PERKY, OF GLENCOE, MARYLAND; LABAN SPARKS ADMINISTRATOR OF SAID HENRY D. PERKY, DECEASED.

MANUFACTURE OF FOOD FROM CEREALS.

987,088.  Specification of Letters Patent.  Patented Mar. 14, 1911.

Application filed January 19, 1906. Serial No. 296,868.

*To all whom it may concern:*

Be it known that I, HENRY D. PERKY, a citizen of the United States, and resident of Glencoe, in the county of Baltimore and State of Maryland, have made a certain new and useful Invention in Methods of Manufacturing Food from Cereals; and I declare the following to be a full, clear, and exact description of the same, such as will enable others skilled in the art to which it appertains to make and use the invention.

The object of the invention is the preparation of grain, and particularly of Indian corn or maize in a novel, palatable and attractive form for food; and the invention consists in a new process of manufacture, as hereinafter set forth.

In the accompanying drawings, Figure 1 represents a press. Fig. 2 a press cylinder with removable heads. Fig. 3 a perforated plate.

Maize, as is well known, exists in many varieties having different characteristics. The golden yellow corn is distinguished from the white corn not only because of the marked contrast in color, but also because of the variation in the constituent elements, white corn having a greater proportion of protein, among other differences of minor importance.

In carrying out this invention, the grains are designed to be deprived of their hulls by means of any ordinary process. The corn is then ground and, mixed with a little more water than material, is cooked in an airtight or nearly air-tight and water-tight vessel such as shown in Fig. 2, by immersing the same in boiling water for about seven hours for corn, or until the cooking is completed, the time depending upon the kind of grain employed. In this process, the amount of water is designed to be limited to that which will be taken up by the material in cooking, it being intended to avoid the evolution of steam or vapor so far as possible in order to preserve in the cooked article the aroma and other properties of the grain, which might otherwise be carried off or dissipated. The cooked material is then cooled, and then is designed to be pressed through a perforated plate in such a manner as to produce elongated forms or sprays of uniform length, which are dried in the vertical position separable from each other so as to provide independent forms or sprays of tender structure, which are homogeneous in texture and appearance and are of similar size.

The perforations of the plate employed are designed to have thin edges and are preferably of small diameter. Apertures about one-sixteenth of an inch wide give good results for corn. The length of the sprays is usually less than an inch, such length depending mainly on the consistency and character of the material and on the size of the perforation. The material is pressed from below upward through the perforations of the plate until the sprays have the desired length, their consistency being such that they will remain on the plate in upright position. The plate is then removed from the press, terminating or cutting off the forms in uniform length, such sections adhering to the perforations of the plate by their ends, and being held or posed thereby in vertical position, and separate from each other. The plate with its charge is then transferred to a drier, the heated air of which, having ready access to all parts of each form, rapidly takes away the moisture leaving the product in condition for use. The plate with the finished sprays held thereby in upright position may be taken directly to the table for consumption, or the sprays may be removed from the plate for packing in suitable cartons for the trade. Among other grains, it is designed to provide these sprays from yellow corn and also from white corn, and as the sprays may be made of similar size both in length and thickness they may be readily mixed together in proper proportions to give the product a lively and agreeable appearance, as well as to provide a mixture in which the chemical constituents, especially in regard to protein may be altered in regard to their relative proportions.

Having described the invention, what I claim and desire to secure by Letters Patent is—

A process of cooking ground grain mixed with a limited amount of water as described, in an air-tight vessel, and, after cooling, the cooked material to a consistency capable of self-support when formed into vertical sprays, pressing a limited amount thereof in the vertical direction through perforations of a plate to form sprays, which because of such consistency maintain themselves in separate position, and drying the same while supported on the plate.

In testimony whereof I affix my signature, in presence of two witnesses.

HENRY D. PERKY.

Witnesses:
Wm. C. Breed,
L. S. Burbank.